United States Patent [19]
Whitener

[11] 4,036,455
[45] July 19, 1977

[54] AIR-CARGO LINER

[75] Inventor: Philip C. Whitener, Seattle, Wash.

[73] Assignee: The Boeing Company, Seattle, Wash.

[21] Appl. No.: 535,413

[22] Filed: Dec. 23, 1974

[51] Int. Cl.$^2$ .............................................. B64D 9/00
[52] U.S. Cl. ................................ 244/118 R; 244/123;
244/137 R; 141/113; 141/87
[58] Field of Search ...................... 244/135, 118 R, 36,
244/13, 123, 12 B, 137 R, 136, 119, 117;
141/106, 364, 369, 370, 86, 87, 1, 113, 237;
222/166; 137/344, 613; 214/38 R, 47, 62 A,
301, 311, 308, 84, 505, 314, 312; 105/358, 361;
302/12 R

[56] References Cited
U.S. PATENT DOCUMENTS

| | | | |
|---|---|---|---|
| 1,135,669 | 4/1915 | Culemeyer | 214/62 A |
| 1,138,511 | 5/1915 | Smart | 141/237 |
| 2,315,117 | 3/1943 | Freytag | 244/118 R |
| 2,341,997 | 2/1944 | Law et al. | 244/123 |
| 2,384,628 | 9/1945 | Krone et al. | 137/613 X |
| 2,554,122 | 5/1951 | Robert | 244/123 X |
| 2,633,258 | 3/1953 | Temple et al. | 214/314 |
| 2,979,087 | 4/1961 | Vogt | 141/113 |
| 2,988,152 | 6/1961 | Katzenberger et al. | 244/123 X |
| 2,990,138 | 6/1961 | Shaw | 244/12 B |
| 3,209,929 | 10/1965 | Peterson et al. | 244/137 R |
| 3,269,571 | 8/1966 | McLean et al. | 214/312 |
| 3,502,195 | 3/1970 | Benner | 302/21 R X |
| 3,595,407 | 7/1971 | Muller-Kuhn | 244/137 R |
| 3,774,864 | 11/1973 | Harkamp | 244/36 X |
| 3,779,487 | 12/1973 | Ashton et al. | 244/123 |
| 3,809,115 | 5/1974 | Klein | 137/344 |

OTHER PUBLICATIONS

Flight, Nov. 1973, "Boeing Predicts", pp. 745, 746.

Primary Examiner—Trygve M. Blix
Assistant Examiner—Galen L. Barefoot
Attorney, Agent, or Firm—Robert W. Beach

[57] ABSTRACT

For increasing the cargo capacity of an airplane of given weight, the cargo space is formed by a plurality of parallel tubes having their lengths extending spanwise of the wing, so that such cargo-carrying space is generally coextensive with the lift-producing airfoil. Auxiliary lift-producing fans may also be spaced spanwise of the wing, and the ground effect of such fans may be augmented by skirts depending from the wing. Propulsion thrust engines are also spaced spanwise of the wing to distribute thrust loading. The airplane wing is tilted downwardly spanwise so that containerized or particulate solid cargo or liquid cargo can be supplied to the cargo tubes through the lower wing tip, and such cargo can be removed from the cargo tubes by gravity or assisted by air under pressure to fluidize or expel the cargo. The wing may carry a plurality of spaced parallel fuselages.

18 Claims, 33 Drawing Figures

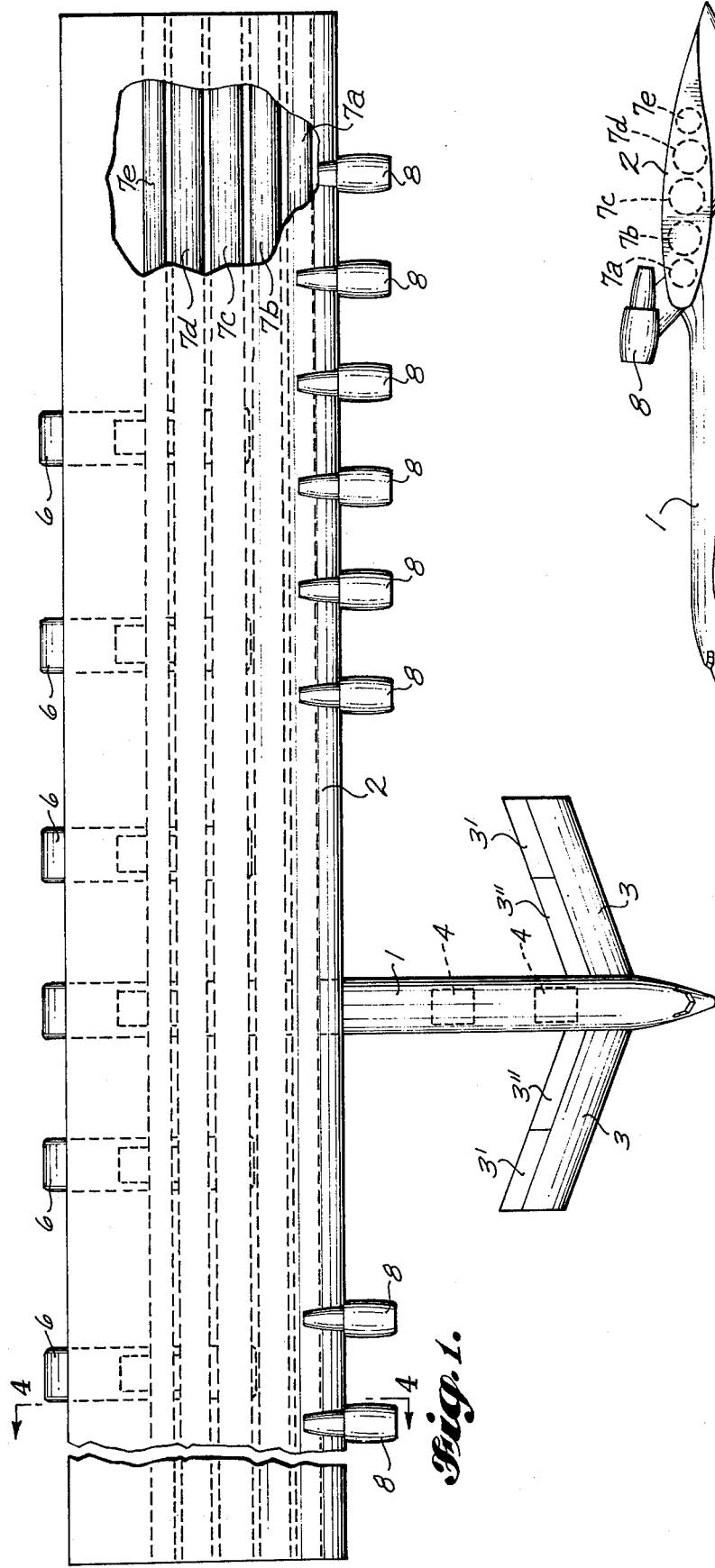
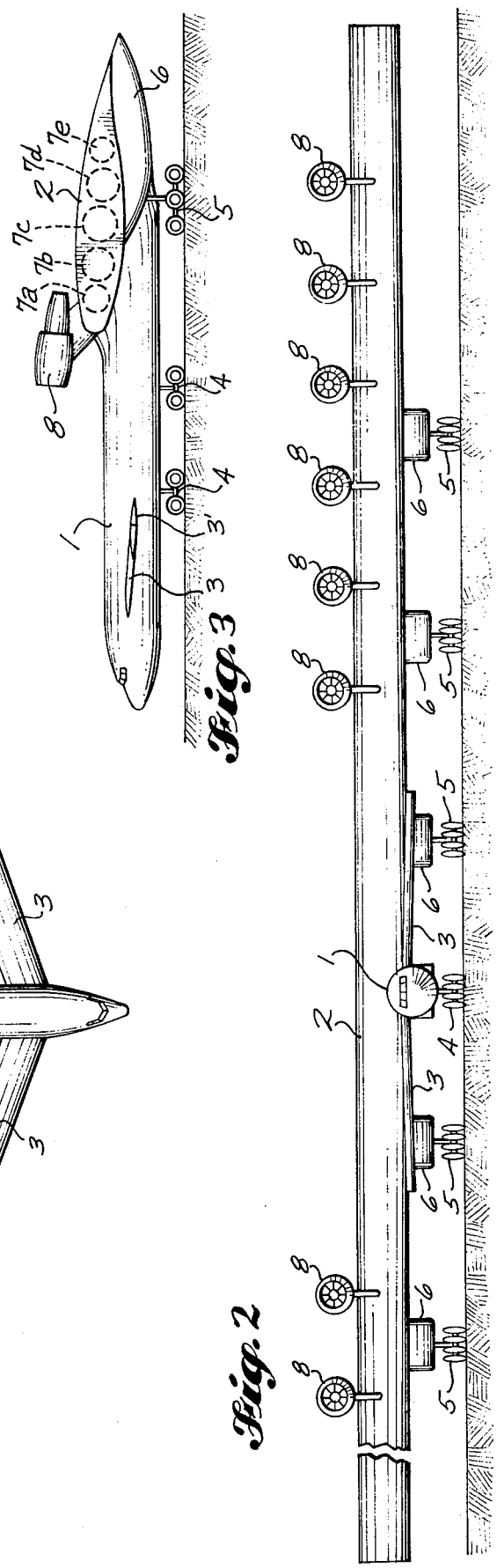
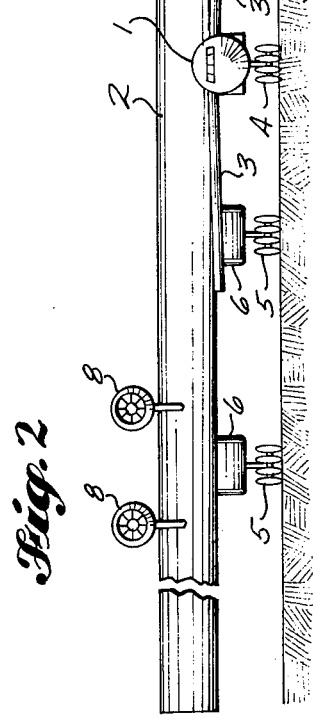

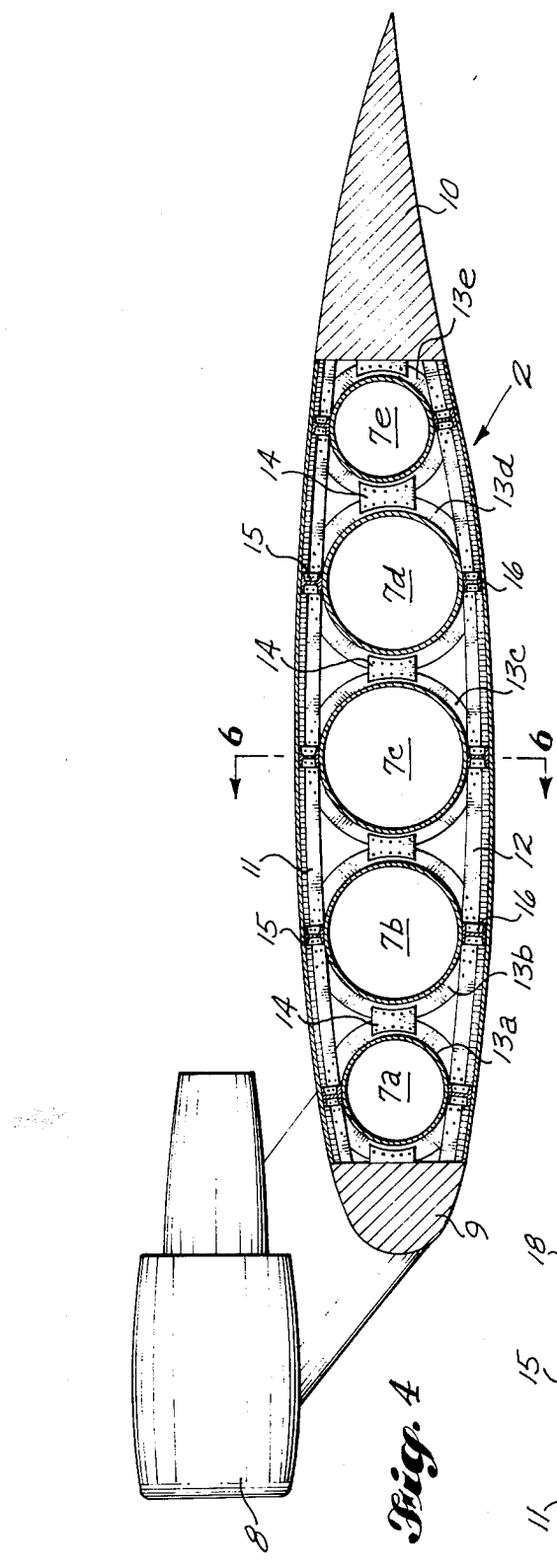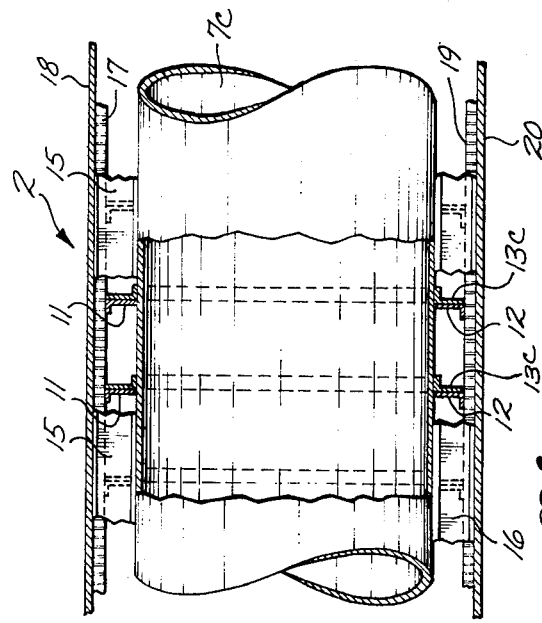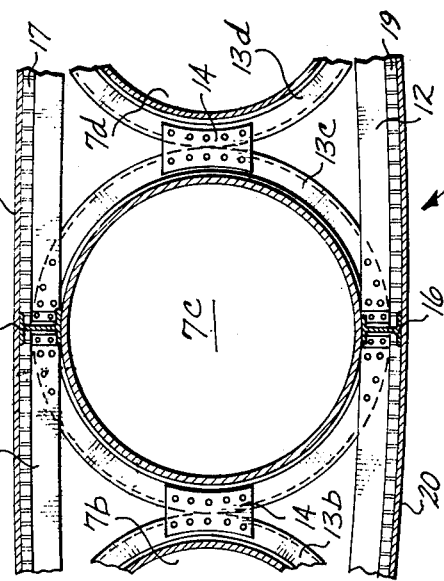

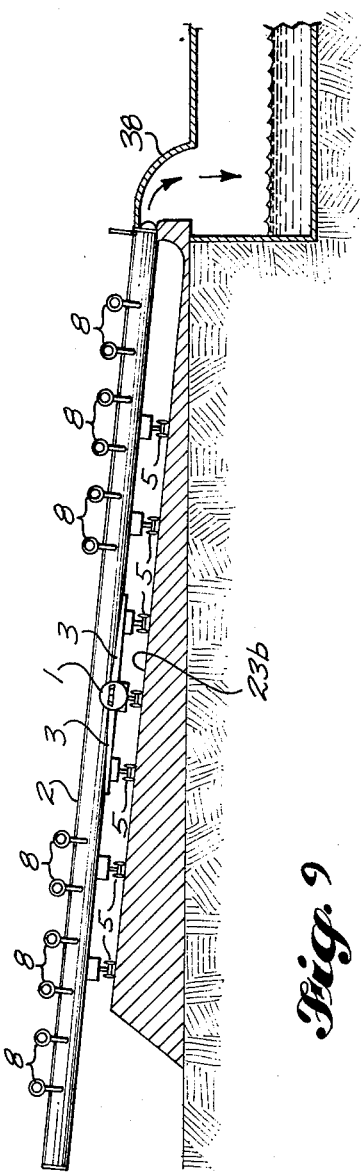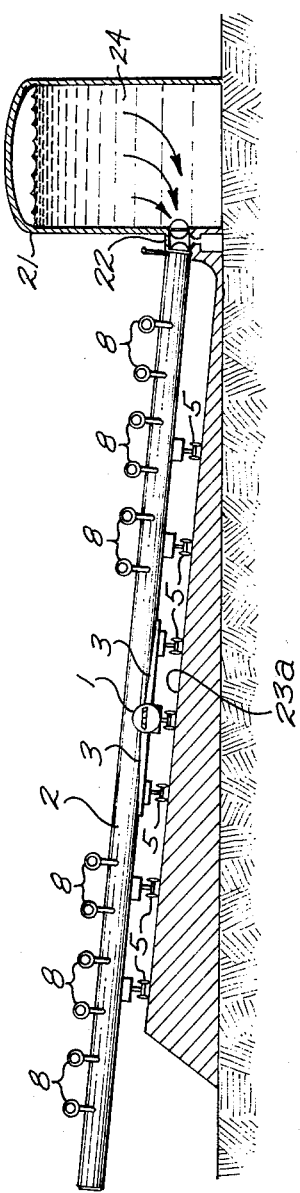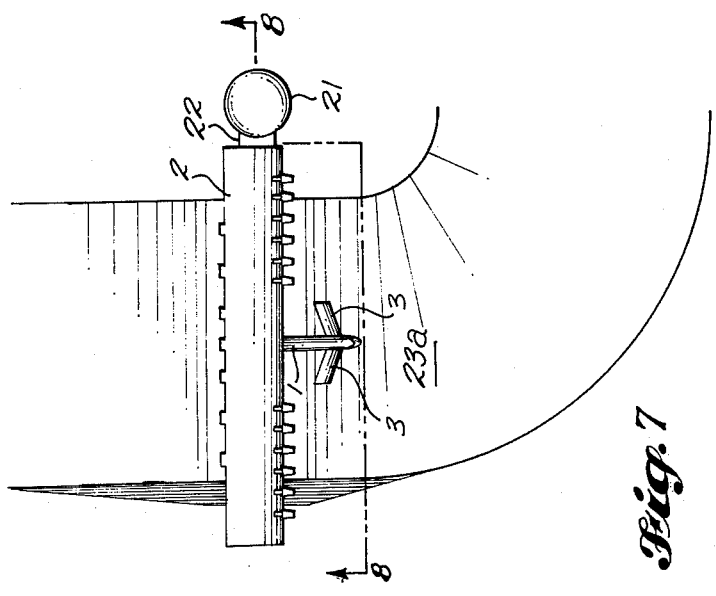

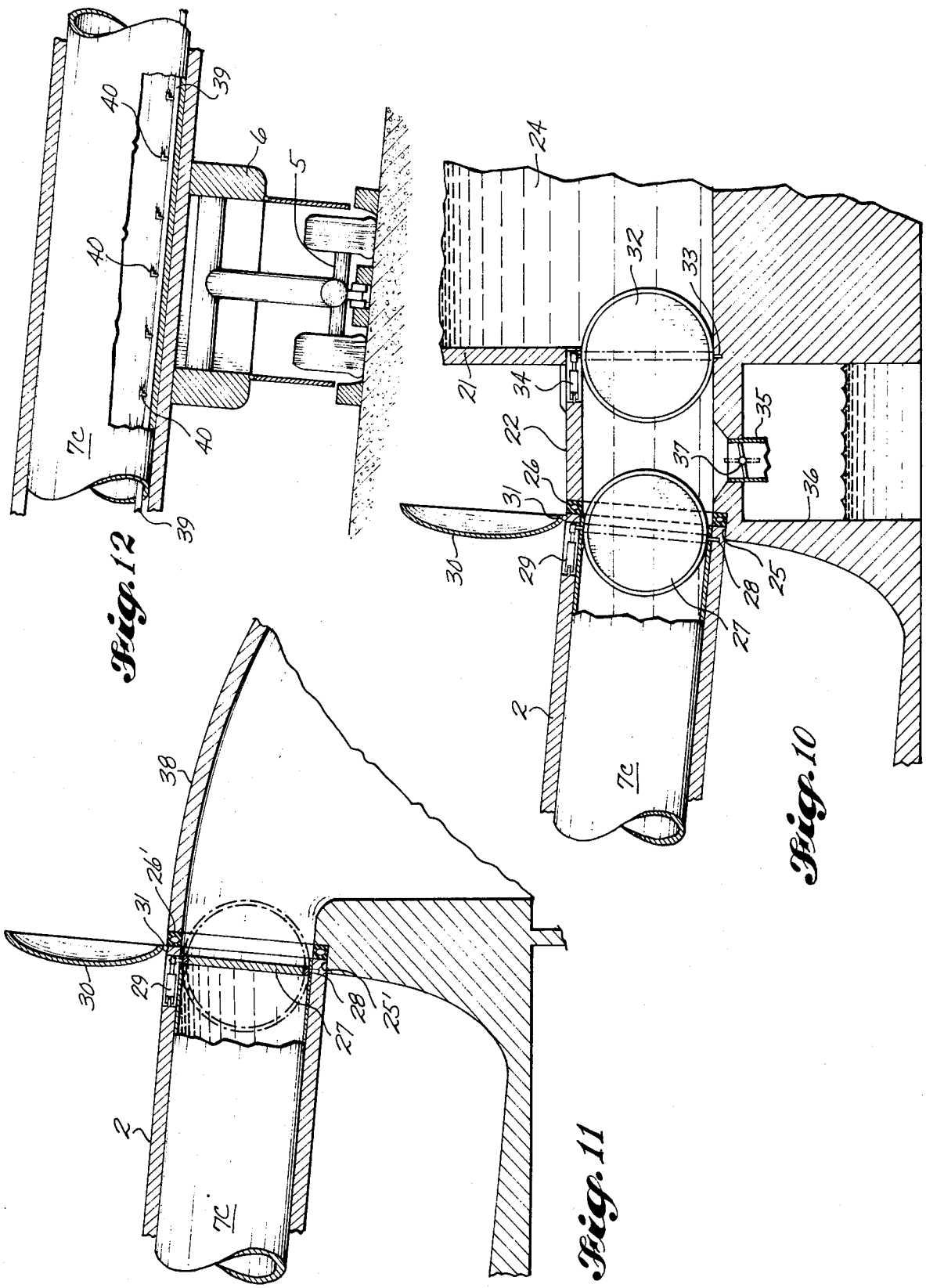

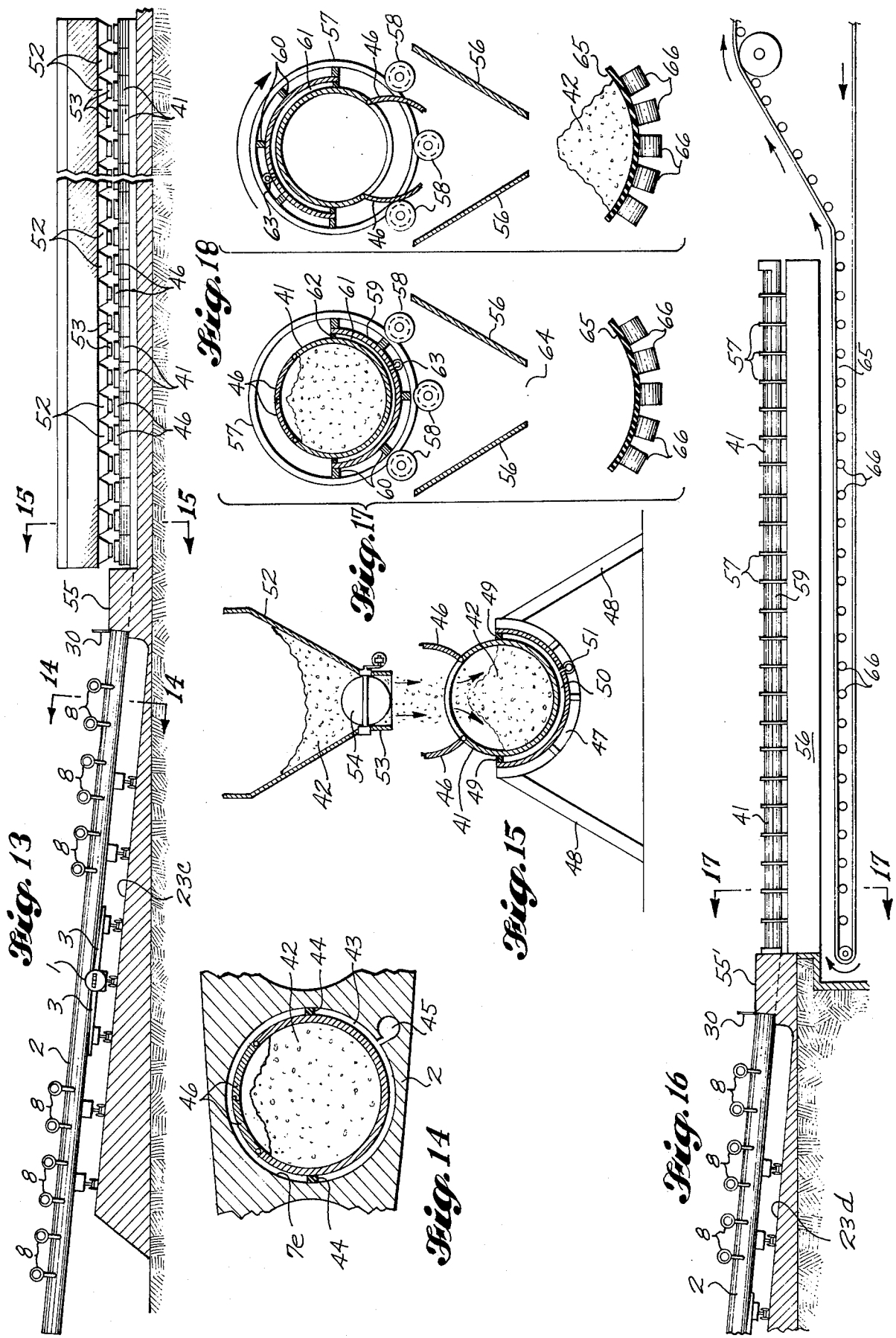

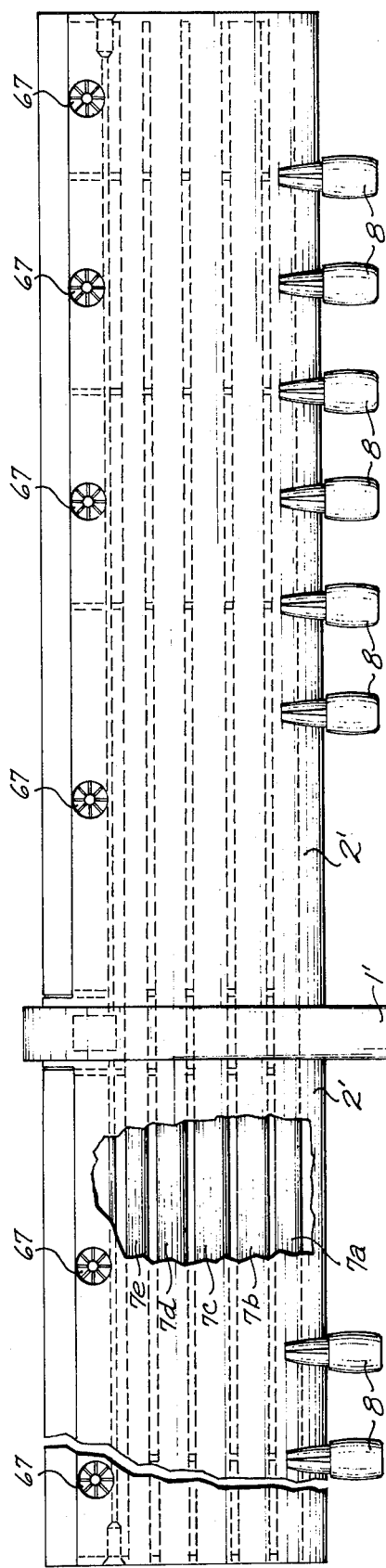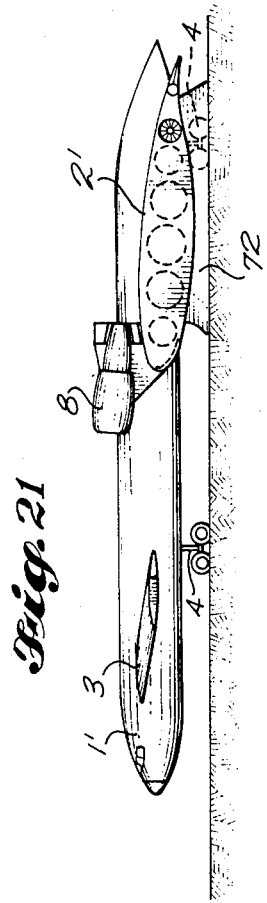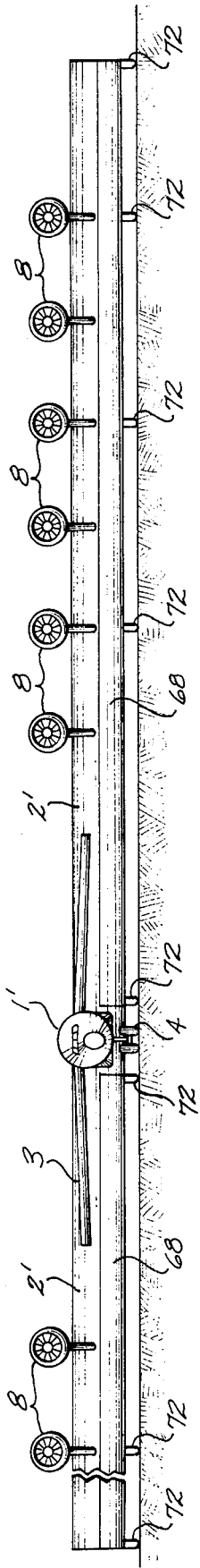

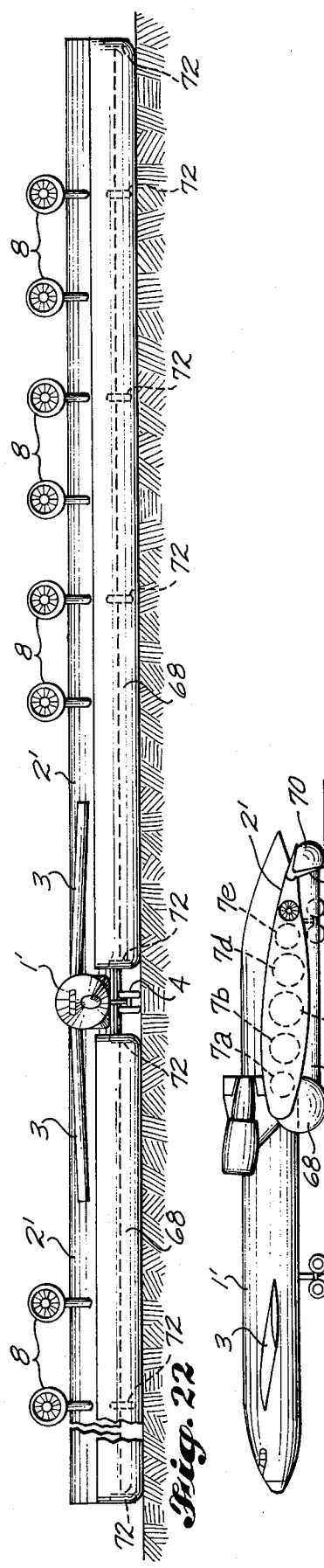
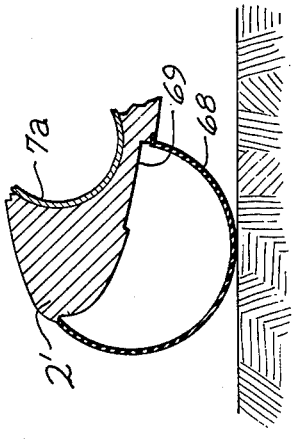
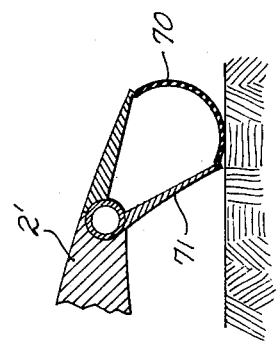

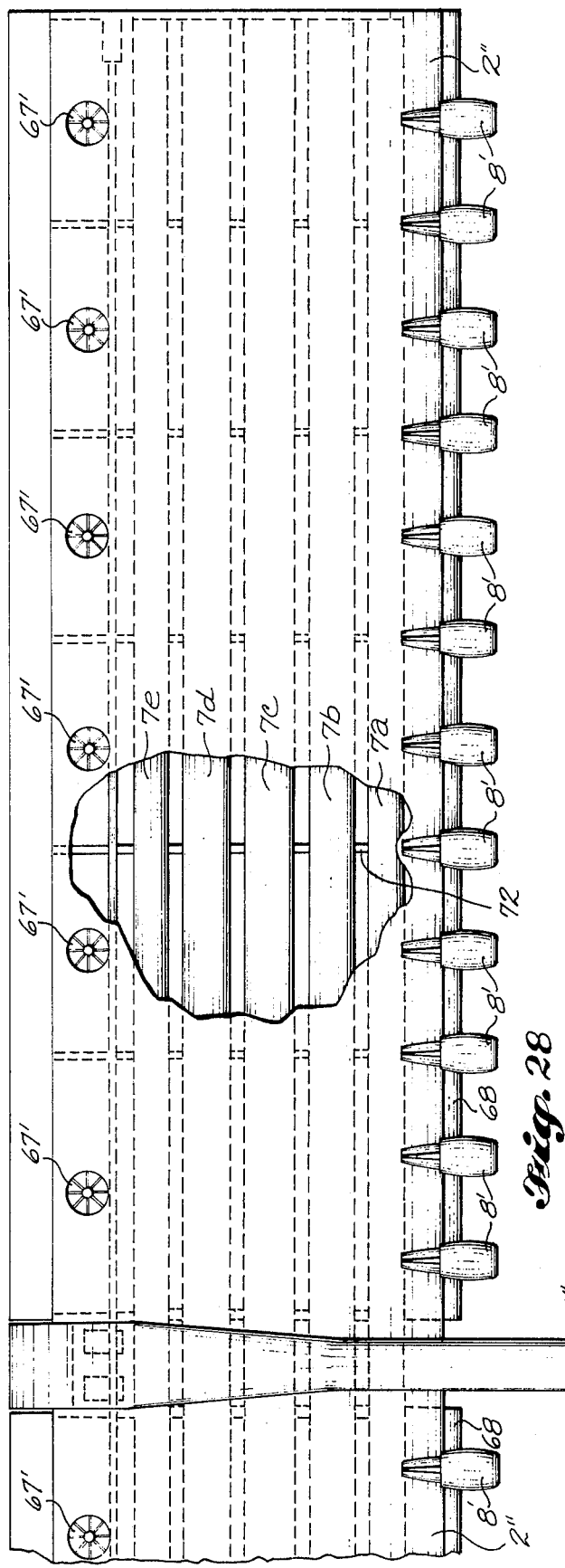
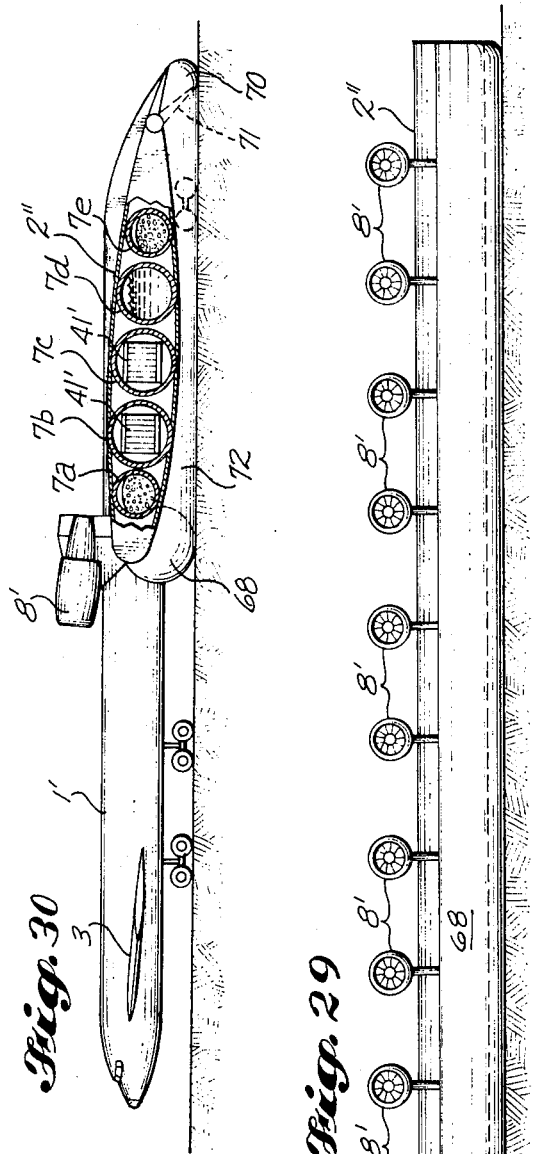
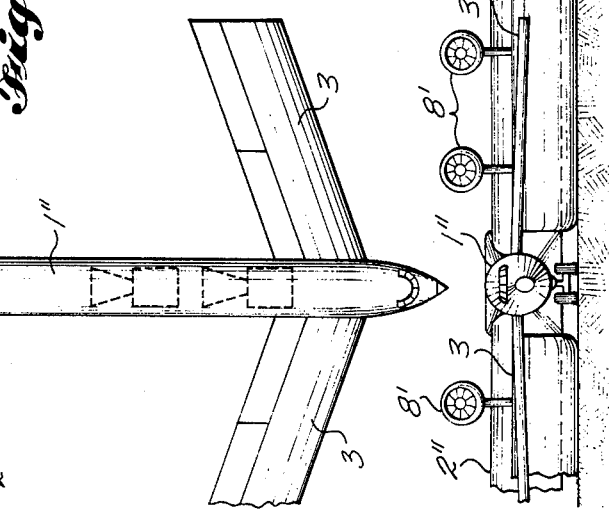
Fig. 28
Fig. 30
Fig. 29

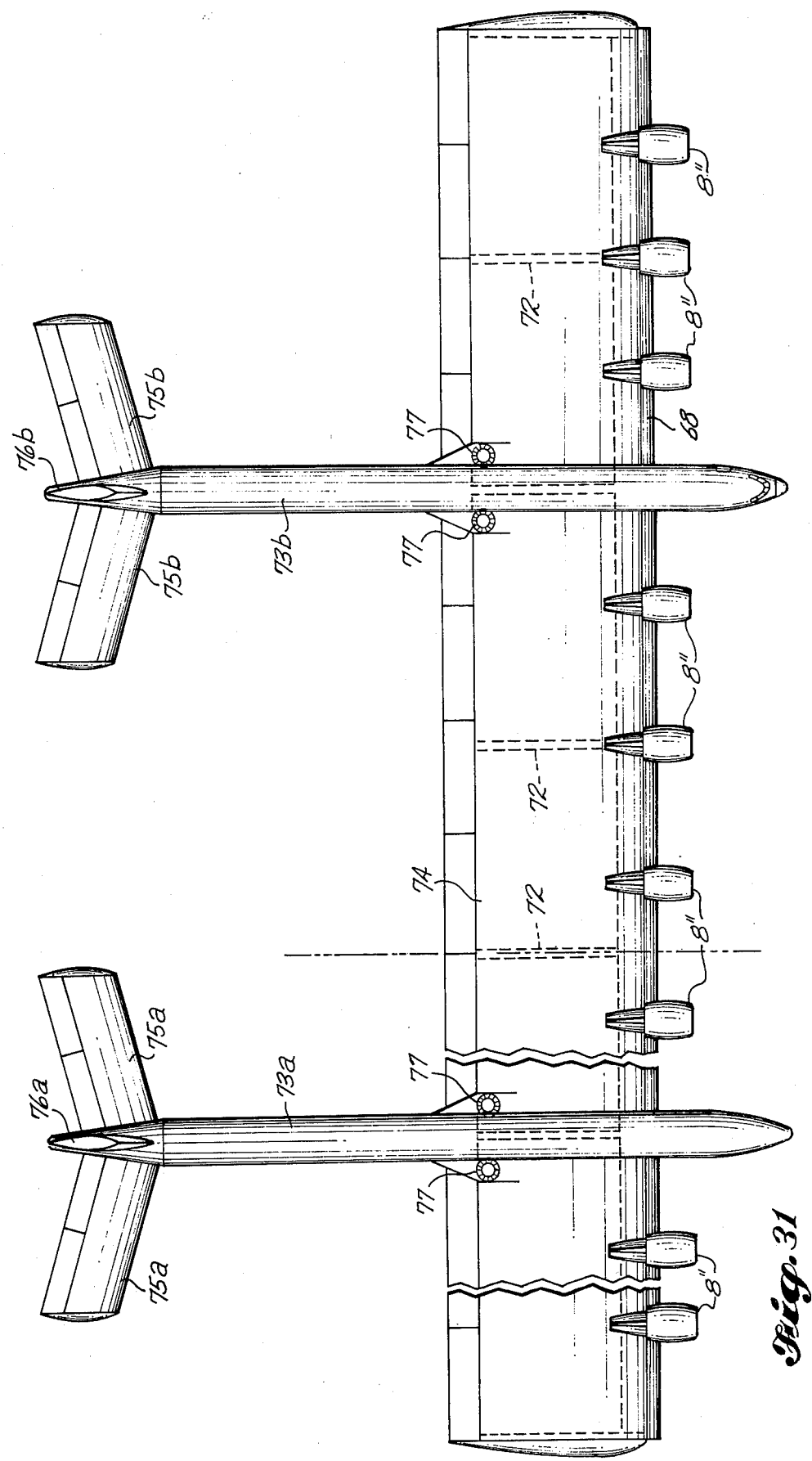

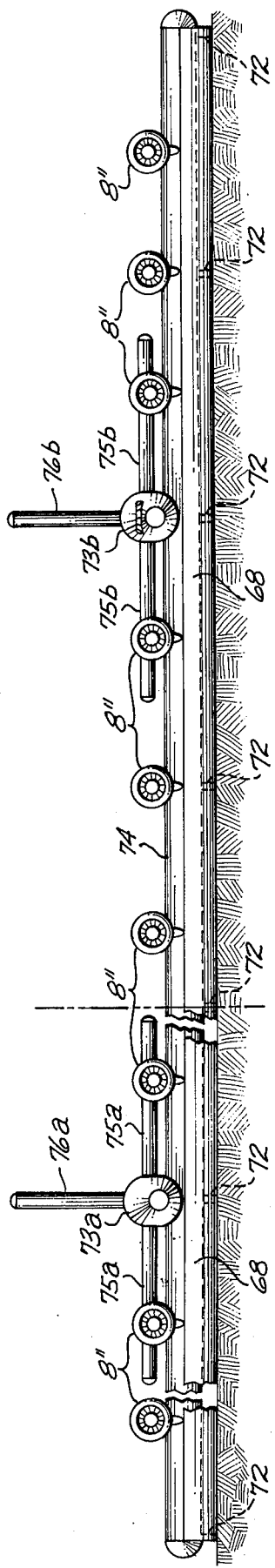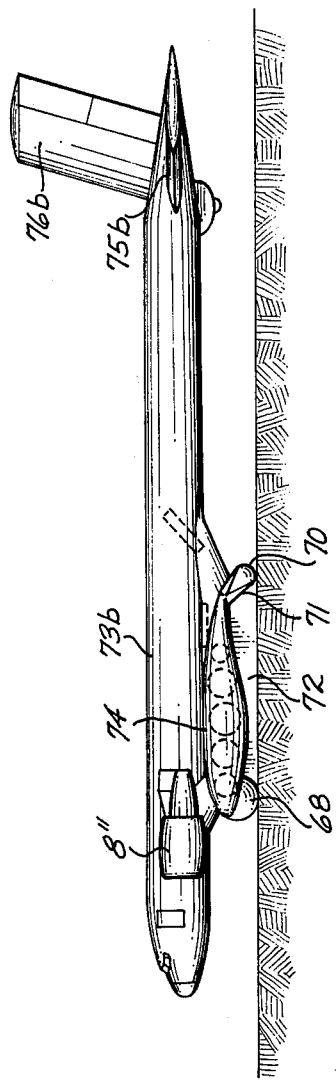

AIR-CARGO LINER

BACKGROUND OF THE INVENTION

1. Field of the Invention

The present invention pertains to air-cargo liners and particularly to such air-cargo liners in which the air-cargo space is provided in the airplane wing.

2. Prior Art

In most air-cargo liners the air-cargo space has been in fuselages supported by wings, so that the junctions between the fuselages and the wings were required to be sufficiently strong to support the weight of the cargo.

In other types of air cargo liners, commonly designated "flying wings", the air-cargo space was in the wing, but the wing was tapered spanwise toward the tip, and the aerodynamic characteristics of the wing was inherently unstable.

SUMMARY OF THE INVENTION

It is a principal object of the present invention to reduce the weight of the airplane structure required to carry a given load or to increase the efficiency of the airplane structure by distributing the cargo generally coextensively with the aerodynamic lift on the airplane.

More specifically, it is an object to distribute the weight of the cargo generally uniformly spanwise of the wing and to provide a wing having lift-producing structure which will produce a lift distributed approximately uniformly spanwise of the wing.

A further object is to provide supplemental lift for an airplane wing when it is near the ground during landing and take-off, which supplemental lift will be distributed approximately uniformly spanwise of the wing.

Another object is to facilitate loading and unloading of cargo space distributed generally uniformly spanwise of the wing.

It is also an object to provide supplemental lift structure which can be changed from inoperative to operative condition quickly and easily.

The foregoing objects can be accomplished by providing an air-cargo liner hold in the form of elongated tubes in an airplane wing of uniform cross section, the tubes having their lengths extending spanwise of the wing and opening at one wing tip. Cargo can be supplied to and removed from such tubes through the lower wing tip when the airplane is tilted spanwise. The lift of the wing can be supplemented particularly during take-off and landing by fans spaced spanwise of the wing. By projecting skirts downward from the leading and trailing edges of the wing, the ground effect produced by such can be increased. Additionally, downwardly projecting partition skirts extending chordwise of the wing and spaced spanwise of it may be provided.

BRIEF DESCRIPTION OF THE DRAWINGS

FIG. 1 is a plan of an air-cargo liner embodying the present invention with parts broken away.

FIG. 2 is a front elevation of such airplane, and FIG. 3 is a side elevation of the airplane.

FIG. 4 is a transverse section through a wing of the airplane shown in FIG. 1, taken on line 4—4 of that figure; FIG. 5 is an enlarged, fragmentary detail vertical section of a portion of FIG. 4; and FIG. 6 is an enlarged fragmentary detail section taken on line 6—6 of FIG. 4.

FIG. 7 is a plan of an air-cargo liner such as shown in FIG. 1 in cargo-handling position, and FIG. 8 is an enlarged front elevation and section through FIG. 7 on line 8—8. FIG. 9 is a combined front elevation and section comparable to FIG. 8, showing a different type of cargo-handling structure.

FIG. 10 is an enlarged fragmentary detail vertical section through a portion of the cargo-handling mechanism shown in FIG. 8. FIG. 11 is an enlarged fragmentary detail section through a portion of the cargo-handling mechanism shown in FIG. 9.

FIG. 12 is an enlarged fragmentary detail longitudinal vertical section through a portion of the airplane illustrated in FIGS. 1, 2 and 3.

FIG. 13 is a front elevation of an air-cargo liner in cargo-handling condition associated with a type of cargo-handling mechanism different from that shown in FIGS. 8 and 9. FIG. 14 is an enlarged fragmentary detail section taken along line 14—14 of FIG. 13, and FIG. 15 is an enlarged fragmentary detail section taken on line 15—15 of FIG. 13.

FIG. 16 is a front elevation of a portion of an air-cargo liner in cargo-handling position associated with cargo-handling mechanism. FIG. 17 is an enlarged fragmentary detail section through cargo-handling mechanism taken on line 17—17 of FIG. 16, and FIG. 18 is a corresponding view showing parts in different positions.

FIG. 19 is a plan of a modified embodiment of an air-cargo liner according to the present invention with parts broken away.

FIG. 20 is a front elevation of such modified embodiment with parts broken away. FIG. 21 is a side elevation of such modified embodiment.

FIG. 22 is a front elevation of the modified embodiment of an air-cargo liner comparable to FIG. 20, but showing parts in different positions. FIG. 23 is a side elevation of such modified air-cargo liner similar to FIG. 21 but with parts in different positions.

FIG. 24 is an enlarged fragmentary detail vertical section through the leading portion of the wing of the air-cargo liner shown in FIGS. 19, 20 and 21, and FIG. 25 is a similar view showing a part in a different position. FIG. 26 is an enlarged fragmentary detail vertical section through the trailing portion of the wing of the airplane shown in FIGS. 19, 20 and 21, and FIG. 27 is a similar view with parts in different positions.

FIG. 28 is a plan of a further modified type of cargo liner according to the present invention, having parts broken away. FIG. 29 is a front elevation of such further modified air-cargo liner with parts broken away. FIG. 30 is a side elevation of such further modified air-cargo liner.

FIG. 31 is a plan of still another form of air-cargo liner according to the present invention, having parts broken away. FIG. 32 is a front elevation of the air-cargo liner shown in FIG. 31 with parts broken away. FIG. 33 is a side elevation of the air-cargo liner shown in FIGS. 31 and 32.

DETAILED DESCRIPTION OF THE INVENTION

First Embodiment

In the air-cargo liner of the present invention the fuselage 1 is shown as being carried beneath the central portion of the wing 2 to constitute a high-wing monoplane. The fuselage 1 is shown as projecting only forward from the wing. Horizontal stabilizing surfaces 3 project oppositely from the forward portion of the fuselage 1 and may include elevators 3' and flaps 3". On the ground the fuselage 1 is supported by tandem landing gear units 4, and the wing is supported by additional landing gear units 5.

In order to provide maximum structural efficiency of the air-cargo liner, the cargo hold is located in the wing which also provides the aerodynamic support for the airplane. Preferably the wing 2 is of substantially constant chordwise section throughout substantially its entire length, as shown in FIGS. 1, 2 and 3, and the cargo hold is distributed substantially uniformly spanwise of the wing. Consequently it is desirable to provide a number of landing gear units 5 spaced spanwise of the wing for supporting the wing from the ground directly instead of the fuselage carrying the entire wing and the cargo which it contains. The landing gear units 4 are retractable into the fuselage 1, and the landing gear units 5 are retractable into pods 6 projecting downward from the under side of the wing 2.

In order to distribute the cargo hold substantially uniformly spanwise of the wing 2, such hold is composed of several straight spar and cargo hold tubes disposed in parallel relationship with their lengths extending spanwise of the airplane wing. Five of these cargo hold tubes 7a, 7b, 7c, 7d and 7e are shown in FIGS. 1, 3 and 4. Each of the tubes is of constant and uniform cross section throughout its length as shown in FIG. 1, and the tubes are preferably of circular cross section. The tubes are of decreasing diameter from a central tube toward the leading edge. Thus the diameter of tube 7b is smaller than the diameter of the central tube 7c, and the diameter of the most forward tube 7a is smaller than the diameter of the tube 7b. Also the tubes are of decreasing diameter from the central tube toward the trailing edge. The dimeter of tube 7d is smaller than the diameter of tube 7c, and the diameter of tube 7e is smaller than the diameter of tube 7d. The tubes are preferably cylindrical, being of constant cross section throughout their lengths from wing tip to wing tip, and disposed with their axes in substantially coplanar relationship.

Further to promote the efficiency of the airplane structure, the propulsive forces are applied to the cargo-carrying wing and are distributed over the structure so as to reduce stress concentration points. Jet propulsion units 8 are shown as carried by the wing at spanwise spaced locations. FIGS. 8 and 9 shown that twelve of these units are provided, six at each side of the spanwise center of the wing. These propulsion units are of conventional type.

The tubes 7a, 7b, 7c, 7d and 7e not only constitute a cargo-carrying hold for the air-cargo liner, but also are integrated with each other and other components of the wing structure to serve as wing spars. The central composite spar section of the wing carries a leading edge section 9 and a trailing edge section 10 of conventional structure. The composite spar structure is integrated with rib elements including an upper chord member 11 and a lower chord member 12. These chord members are secured to the upper and lower peripheral portions of rings 13a, 13b, 13c, 13d and 13e forming annular flanges around the respective cargo tubes 7a, 7b, 7c, 7d and 7e. The adjacent circumferential portions of adjacent rings are secured together by cleats 14 as shown in FIGS. 4 and 5. Upper stringers 15 and lower stringers 16 having their lengths extending spanwise of the wing connect the upper and lower portions of the rings of each set 13a, 13b, 13c, 13d and 13e spaced spanwise of the wing.

The skin construction of the wing can be conventional. The upper surface of the wing is shown as including a stiffening underlayer 17 and a smooth exterior layer 18. Similarly, the lower skin of the wing includes a stiffening underlayer 19 and a smooth exterior layer 20. Such under layers 17 and 19 will be bonded or otherwise suitably integrated with the exterior layers and will be attached to the composite rib and spar structure of the wing between the leading edge section 9 and the trailing edge section 10.

Special techniques are required to load cargo into the cargo tubes 7a, 7b, 7c, 7d and 7e and to remove cargo from such tubes. FIGS. 7 to 11, inclusive, disclose installations for loading liquid cargo into and removing such cargo from the cargo tubes through a tip of the wing 2. Liquid cargo to be loaded into the wing is stored in a tank 21 that can be connected to a tip of wing 2 by a connection 22. Such connection can be attached to a tip of the air-cargo liner wing when the wing is tilted to slope spanwise downward to such connection. Such tilting is effected by supporting the liner on a surface 23, sloping downward toward the storage tank 21.

While the airplane could be disposed in such spanwise tilted condition by various expedients, such as by tilting the supporting surface or transporting the liner bodily onto an inclined surface, it is preferred to form the sloping surface 23a as a portion of a taxiway, as shown in FIG. 7, along which the airplane can be moved longitudinally into the position shown in FIG. 8. The taxiway is contoured so that the transverse slope toward the tank 1 increases gradually to the section 23a shown in FIG. 8. The liner can be moved longitudinally by taxiing along the taxiway or by being towed instead of being moved by thrust of its power plants 8.

When the lower tip of the wing 2 with the airplane tilted has been placed in the proper position relative to connector 22, the liquid cargo 24 can be loaded from the tank 21 through such connector into the cargo tubes 7a, 7b, 7c, 7d and 7e. As shown in FIG. 10, to make the connection between such tubes and the connector 22, the wing tip rests on ledge 25 and a sealing gasket 26 is interposed between the wing tip and the connector. A butterfly valve 27 mounted on a diametral shaft 28 having its axis upright is swingable by an actuator 29, such as a fluid pressure jack, to close or open the wing tip end of each cargo tube. When the valves for the various tubes are closed, the entire wing end can be covered by a cover 30 mounted on the wing by a hinge 31.

Communication between the storage tank 21 and the connector 22 is controlled by a second butterfly valve 32 mounted on a diametral upright shaft 33. Such valve can be swung between open and closed position by an actuator 34 which may be of the fluid jack type. Fluid trapped between butterfly valves 27 and 32 in their closed positions can be drained from the connector 22 through a drain tube 35 into a sump 36 by opening butterfly valve 37.

When it is desired to load liquid cargo 24 into the cargo tubes 7a, 7b, 7c, 7d and 7e, the lower tip of wing 2 is first connected to the connector 22 with the wing tip cover 30 in open position as shown in FIG. 10. The actuator 29 for each tube is than operated to swing its valve 27 to the open position shown in that figure, and care is taken to insure that valve 37 is closed. Each valve 32 is then swung to the open position shown in FIG. 10, whereupon the liquid cargo will flow through the connector 22 into all the cargo tubes of the wing simultaneously because the head of liquid 24 in the storage tank 21 is higher than the higher tip of wing 2. Suitable provision may be made for venting air from the higher ends of the tubes as the filling procedure progresses.

When the cargo tubes 7a, 7b, 7c, 7d and 7e have been filled completely with the cargo liquid 24, the valve actuators 29 and 34 can be operated to swing their respective butterfly valves 27 and 32 to the closed position indicated in broken lines in FIG. 10. Valve 37 can then be opened to drain liquid from the connector 22 through the drainpipe 35 to the sump 36. The air-cargo liner can then be moved forward along the taxiway shown in FIG. 7 until the lower tip of wing 2 is out of registration with the connector 22. The wing tip cap 30 can then be swung downward into closed position to place the airplane into condition for taking off to fly to its destination. Reservoir 21 can then be filled with cargo liquid 24 to load another air-cargo liner.

At the destination of the liner, facilities such as shown in FIGS. 10 and 11 are provided for unloading of the cargo from the cargo tubes. The unloading facility shown in FIG. 11 includes a receiving tank 38 having a port including a ledge 25' designed to fit the lower end of the tilted wing 2. A sealing gasket 26' will be interposed between the communicating port of the receiving tank 38 and the lower wing tip. The connection between the port of receiving tank 38 and the wing tip will be made after the wing tip cover 30 has been swung into the upper position shown in FIG. 11, but while the butterfly valves 27 are in their closed positions shown in full lines in FIG. 11.

After the connection has been made between the lower tip of wing 2 and the receiving tank 38, actuator 29 can be operated to swing the valve 27 from the solid-line position of FIG. 11 into the broken-line position of that figure, so that the liquid cargo can drain from the cargo tubes 7a, 7b, 7c, 7d and 7e into the receiving tank 38. To expedite such drainage, the upper ends of such tubes can be suitably vented. To facilitate further emptying of the cargo tubes, a conduit 39 for carrying compressed air may be provided in each of the tubes as indicated in FIG. 12. Such air pressure line has nozzles 40 arranged along it at intervals for projecting air jets into the body of the cargo liquid in the direction toward the connection to the receiving tank 38. Such air jets will expedite the flow of the liquid cargo into the receiving tank and are particularly helpful if the cargo liquid is of viscous character.

The cargo which can be effectively transported in the cargo tubes is not limited to liquid cargo. FIGS. 13 to 18 inclusive show equipement that can be used for loading particulate material into the cargo tubes and unloading such material from such tubes. As in loading and unloading liquid cargo, the cargo-handling operations are accomplished with the airplane tilted spanwise. FIGS. 13 to 15 inclusive show equipment for loading particulate material into the cargo tubes when the air-cargo liner has been taxied onto the inclined support surface 23c.

With the construction shown in FIGS. 13 to 18 inclusive, the particulate material is not loaded directly into the cargo tubes, but instead sectional containers 41 are provided to hold particulate material 42. Such containers are of cylindrical shape having external diameters somewhat smaller than the internal diameter of the cargo tubes so that when the sectional containers are inserted into the cargo tubes, an annular space 43, shown in FIG. 14, encircles the sectional containers. Such annular space may be divided into a lower section and an upper section by sealing strips 44 extending longitudinally of the cargo tubes and located diametrically opposite each other. Air under pressure can be supplied to the lower section of the space 43 through a duct 45 communicating with such space to support the sectional containers on an air cushion.

Access to the interior of the containers 42 is afforded through a hatch in a side of the container closed by trapdoors 46 swingable upward and outward into open position, as shown in FIG. 15. Such sectional containers 41 can be loaded while being supported in a cradle frame 47, supported by upwardly converging walls 48. Sealing strips 49 extending axially of the sectional containers 42 and carried by the opposite edges of the cradle frame form a semicylindrical air space 50 between the cradle wall and the lower portion of the container wall. Air under pressure may be supplied to such space through a duct 51 communicating with it in order to support the weight of the sectional container.

Particulate material 42 for loading a container 41 can be supplied to a hopper 52 overlying the cradle 47. Discharge of material from such hopper through the discharge port 53 is controlled by regulation of a butterfly valve 54 disposed to close the discharge spout. To load a sectional container 41 with particulate material 42 from the hopper 52, the container is placed in the cradle 47, air under pressure is supplied to the space between such cradle and the lower wall of the container, the trapdoors 46 are opened, and the discharge valve 54 is swung to open position to enable particulate material to flow from the hopper into the sectional container until it is filled. The valve 54 is then closed, and the trapdoors 46 are closed to confine the particulate material in the container.

As shown in FIG. 13, particulate containers 41 can be arranged in a row under corresponding material supply hoppers 52. Air may be supplied through the duct 51 to support all of the sectional containers, and the valves 54 of the hoppers 52 can be opened simultaneously or sequentially to fill the containers. The valves 54 are then closed, and the trapdoors 46 also are closed. While air is supplied to the duct 51 for providing an air cushion supporting the containers, force can be applied to the right end of the row of containers, as seen in FIG. 13, to slide them axially through a connector 55 into one or more of the upwardly inclined cargo tubes 7a, 7b, 7c, 7d and 7e. Movement of the containers along the cargo tubes can be facilitated by supplying air under pressure to the ducts 45 as the sectional containers are moved lengthwise of the cargo tubes. By pushing the rows of containers upward in the cargo tubes, it is assured that the containers will remain in end-abutting relationship so that the tubes will be filled completely with the containers.

After the cargo tubes in the airplane wing 2 have thus been loaded, the airplane can be taxied forward along a ramp such as shown in FIG. 7 until the wing 2 again has resumed horizontal position. The air-cargo liner can then be flown to its destination. At such destination the cargo can be unloaded from the cargo tubes by a procedure generally the reverse of the loading procedure described above. Again the airplane is taxied onto an inclined supporting surface 23d so that the wing is tilted lengthwise, as shown in FIG. 16, and the end of the wing 2 through which the cargo is to be discharged is fitted to a connector 55'.

The series of containers can be unloaded in rows from the respective cargo tubes for disposition above an elongated discharge hopper 56. Downward sloping of the airplane wing toward the connector 55' will facilitate discharge of the containers from the cargo tubes.

Rings 57 spaced lengthwise of the hopper 56 bear on cradling rollers 58. A semicylindrical shell 59 extends through the rings, and such shell and the rings are interconnected by stringers 60, forming a framework in which the rings 57 are held in spaced parallel relationship. The radius of the semicylindrical shell is somewhat smaller than the containers 41 so that there is a space between the container and the shell when they are disposed in concentric relationship. Strips 62 extending lengthwise along the edges of the shell 59 engage opposite sides of the containers to provide a sealed air chamber between the shell and the containers.

Containers loaded with particulate material can be floated out of the cargo tubes on a cushion of air supplied through the duct 45 to the space 43 between the cargo containers and the cargo tubes. When the containers have been assembled in the cargo-discharging frame, positioned as shown in FIG. 17 with the semicylindrical shell at the bottom of the frame, suction can be applied to the space 61 between the containers 41 and the shell 59 by exhausting air through a connection 63. The discharge frame can then be rotated on the rollers 58 through a half revolution from the position shown in FIG. 17 to the position of FIG. 18. The containers 41 will be held in position concentric with the shell 59 by atmospheric air pressure on the interior of the containers.

Inversion of the containers to the position of FIG. 18 will cause the particulate material 42 to press on the trapdoors 46 and swing them downward between rings 57 into the open positions shown in FIG. 18. The particulate material will thus be discharged by gravity from the containers and fall into the hopper 56. From such hopper the material is discharged through a bottom opening 64 onto a conveyor belt 65 extending lengthwise beneath the hopper. Such conveyor belt is maintained in trough shape by means supported on rollers 66 arranged with their axes perpendicular to radii of the desired curve of the conveyor belt. The particulate material may be carried by such belt to suitable storage facilities.

Second Embodiment

FIGS. 19 to 27, inclusive, show a modified type of air-cargo liner having the same type of cargo tubes extending spanwise of the wing, as described in connection with FIGS. 1 to 18. This cargo liner, however, is a lowwing monoplane, as shown in FIG. 21, and has its fuselage 1' extending above the wing 2'. Again the fuselage has horizontal stabilizers 3 extending oppositely from its forward portion, which may carry elevators 3' and flaps 3" to control climb and descent of the liner.

As in the previous type of air-cargo liner, the cargo hold is in the form of cargo tubes 7a, 7b, 7c, 7d and 7e, having their lengths extending spanwise of the wing 2'. Correspondingly, the jet engines 8 are mounted on the wing, spaced spanwise of it, to distribute their thrust forces along the wing. In this instance, however, while landing gear units 4 are provided to support the fuselage 1', there are no landing gear units mounted on and distributed spanwise of the wing 2' to support the wing from the ground at spaced locations. Instead, the wing is supported dynamically by air providing a ground effect.

To supplement the ground effect lift action on the wing 2' resulting from its disposition below the fuselage 1', fans 67 are provided in the wing rotatable about upright axes and spaced lengthwise of the wing. Preferably these fans are located in the trailing portion of the wing as shown in FIG. 19 because the fans do not interfere with the cargo tubes 7a, 7b, 7c, 7d and 7e, and there is less interference generally with the wing structure.

The fans 67 draw air from the upper portion of the wing and blow it beneath the wing to increase the differential in pressure between the upper and lower surfaces of the wing and thereby increase the wing lift. In addition, skirt members are provided which can be projected downward from the wing, tending to trap the air supplied by the fans 67 and increase the ground effect of the wing. FIGS. 22, 24 and 25 show a leading edge skirt 68 carried by the leading edge of the wing. This skirt is in the form of an inflatable tube which can be folded close to the underside of the leading portion of the wing, preferably in a recess 69, in retracted condition as shown in FIG. 24. The skirt can be inflated to the projected condition of FIG. 25 to form the leading edge skirt.

A trailing edge skirt 70 of inflatable character can be folded in retracted condition between the trailing portion of the wing and a flap 71 swingable from the upper position shown in FIG. 26 to the downwardly swung position shown in FIGS. 23 and 27. Such skirt member also can be inflated as shown in FIGS. 23 and 27 to project downward from the wing a distance generally corresponding to the downward projection of the leading edge skirt 68. A series of skirt pockets distributed spanwise of the wing may be formed by partition skirt members 72 having their lengths extending fore and aft and located generally centrally between adjacent fans 67 as indicated in broken lines in FIG. 19 and in solid lines in FIG. 20.

When the air-cargo liner is supported on the ground as shown in FIGS. 20, 22 and 23, the leading edge skirt 68, the trailing edge skirt 70, and the partition skirts 72 may be inflated to project them downward into engagement with the ground for supporting the airplane wing statically without the fans 67 being in operation. When it is desired to taxi the airplane, the fans 67 are placed in relatively low-speed operation to supply air under pressure to the ground effect compartments formed by the skirts. The air thus supplied by the fans will escape from the ground effect compartments under the leading edge skirt 68 and the trailing edge skirt 70 to lift them sufficiently above the ground so that they will not be dragged on the ground as the liner is taxied and become worn.

During takeoff of the air cargo liner, the speed of the fans 67 is increased so that a greater volume of air is drawn from the upper side of the wing 2' and discharged beneath it, both to increase the wing lift and to increase the ground effect. During takeoff the leading edge skirt 68 also acts as a leading edge flap, and the trailing edge skirt 70 serves as a trailing edge flap to increase the lift characteristics of the wing. Correspondingly, during landing, projection of the leading edge skirt 68, the trailing edge skirt 70 and the partition skirts 72 will increase the wing lift as the speed of the liner is reduced. Consequently, the lift will be augmented along the entire span of the wing to support the cargo distributed along the wing to enable the wing structure to act with greatest efficiency.

The air-cargo liner shown in FIGS. 28, 29 and 30 is similar to that of FIGS. 19 to 27, inclusive, except that it is larger. While this liner has the same number of cargo hold tubes 7a, 7b, 7c, 7d and 7e, they are larger. This liner has a larger number of ground effect fans 67' and a larger number of jet propulsion units 8' spaced spanwise of the wing 2". The structure of the leading edge skirts 68, the trailing edge skirts 70 and the partition skirts 72 is similar to that described in connection with the liner of FIGS. 19 to 27.

FIG. 30 shows a different type of cargo carried by the cargo tubes. Instead of the cargo being liquid or particulate material, any type of cargo can be shipped in containers 41' of square cross section. Such containers may be all of the same size if the cargo tubes are all of the same cross-sectional size, or may be of different sizes to correspond to cargo tubes of different cross-sectional size. Such containers can be loaded into one end of each cargo tube and moved along the tube on an air cushion supplied to the bottom of the tube or by suitable conveyor means. The length of the containers may all be the same or they may differ as long as the cross-sectional size and shape is appropriate for reception of the containers in the cargo tubes.

Third Embodiment

A third embodiment of the invention is incorporated in the further modified air-cargo liner shown in FIGS. 31, 32 and 33. Like the air-cargo liners shown in FIGS. 19 to 27 and 28 to 30, the liner of FIGS. 31, 32 and 33 is a low-wing monoplane. In this air-cargo liner, however, two fuselages 73a and 73b are arranged in parallel relationship, spaced spanwise of the single wing 74 connecting and supporting such fuselages. Moreover, the wing 74 is located near the forward ends of the fuselages 73a and 73b instead of being located at the aft portions of the fuselages.

Because the wing 74 is located near the forward portions of the fuselages 73a and 73b, the horizontal stabilizers 75a on fuselage 73a and 75b on fuselage 73b are mounted on their aft ends instead of their forward ends. Also, directional control can be augmented by vertical fins and rudders 76a on fuselage 73a and 76b on fuselage 73b.

As shown in FIGS. 32 and 33, the wing 74 has a leading edge skirt 68, a trailing edge skirt 70 and partition skirts 72 as described in connection with the air-cargo liner shown in FIGS. 19 to 27. Air under pressure is supplied to the compartments formed by the skirts by blowers 77 in the trailing portion of the wing 74 as shown in FIG. 31. Air supply ducts from these blowers can extend spanwise through the trailing portion of the wing to distribute air to all of the skirt compartments. Such skirts will support the airplane statically when at rest, and increase the wing lift during landing and take-off as described in connection with the similar mechanism with reference to the air-cargo liner of FIGS. 19 to 27.

I claim:

1. The method of handling cargo for an air-cargo liner having a landing gear which comprises tilting the air-cargo liner laterally while supported by its landing gear and thereby tilting the wing of the air-cargo liner into a spanwise inclined position with its lower tip spaced from the ground, and moving cargo through the lower tip of the spanwise inclined wing into a cargo hold in the wing.

2. The method defined in claim 1, including discharging cargo from a cargo hold in the wing through the lower tip of the spanwise tilted wing.

3. The method of loading cargo into an elongated tube extending spanwise of the wing of an air-cargo liner having a landing gear, which comprises tilting the air-cargo liner while supported by its landing gear and thereby tilting the wing of the air-cargo liner into a spanwise inclined position with its lower tip spaced from the ground, moving cargo containers successively through the lower tip of the spanwise tilted wing into such tube, and supplying gas under pressure to the bottom of such tube along its length for facilitating movement of the containers upward along the tube.

4. The method of handling material cargo with respect to an elongated tube having its length extending spanwise of the wing of an air-cargo liner having a landing gear, which comprises loading material into a plurality of containers when they are arranged in a row, tilting the air-cargo liner while supported by its landing gear and thereby tilting the wing of the air-cargo liner into a spanwise inclined position with its lower tip spaced from the ground, and moving such row of containers lengthwise into the tube through the lower tip of the spanwise tilted wing.

5. The method defined in claim 4, including, after removing the row of containers from the tube, substantially simultaneously inverting all the containers in such row and thereby emptying the material therefrom.

6. The method defined in claim 4, including removing the row of containers from the elongated tube onto a discharge frame having a sheel spaced from the bottoms of the containers, exhausting air from the space between the bottoms of the containers and the shell and thereby holding the containers on the discharge frame by air pressure, and rotating the discharge frame about a longitudinal axis for inverting the containers held thereon and emptying the material therefrom.

7. An air-cargo liner comprising a wing including a covering and several elongated, substantially straight, spar and cargo hold tubes of constant and uniform cross section throughout their lengths having their lengths extending spanwise of said wing unbrokenly from wing tip to wing tip and forming structural wing spars integrated with said wing covering, said tubes having openings in corresponding outboard ends through a tip of said wing for loading cargo into the interior of said tubes.

8. The air-cargo liner defined in claim 7, sectional containers for cargo insertible into and removable from the spar and cargo hold tubes through an outboard end opening, and material supply means for loading material into said several sectional containers simultaneously when they are in a row.

9. The air-cargo liner defined in claim 8, and receiver means for emptying cargo from the several sectional containers simultaneously when they are in a row.

10. The air-cargo liner defined in claim 8, in which each sectional container is of substantially cylindrical shape having its axis disposed substantially horizontally and has an opening in one side thereof, and closure means openable by rotating the container about its axis for dumping material from the container.

11. The air-cargo liner defined in claim 10, and receiver means for supporting a row of sectional containers for rotation about their longitudinal axes to dump the containers substantially simultaneously.

12. The air-cargo liner defined in claim 7, a separate ring encircling each spar and cargo hold tube, said rings being in chordwise alignment, and means bridging between and rigidly connecting the adjacent rings of said chordwise aligned rings.

13. The air-cargo liner defined in claim 12, and individual elongated structural members having their lengths extending spanwise of the wing alongside the respective spar and cargo hold tubes and crossing the rings outwardly of the tubes.

14. An air-cargo liner comprising a fuselage, wings projecting from opposite sides of said fuselage without appreciable sweepback, including a covering and several elongated, substantially straight, spar and cargo hold tubes having their lengths extending continuously and unbroken spanwise of said wings from the tip of one wing across said fuselage to the tip of the other wing and forming structural wing spars integrated with said wing covering, all of said tubes having openings in corresponding outboard ends through a tip of one of said wings for loading cargo into the interior of said tubes.

15. The air-cargo liner defined in claim 14, cargo-handling means for supplying cargo to the spar and cargo hold tubes through their wing tip outboard end openings, and means for tilting the airplane wings spanwise into an attitude with the tubes inclined downwardly toward said cargo-handling means.

16. The air-cargo liner defined in claim 15, the cargo-handling means including a supply tank for liquid having an upper portion at an elevation higher than the higher end of a cargo hold tube in the tilted airplane wings, and connecting means connecting said supply tank to the lower end opening of such tube.

17. An air-cargo liner comprising a wing, a plurality of elongated cargo hold tubes housed in said wing with their lengths extending spanwise of said wing and having openings in said corresponding outboard ends through a tip of said wing for loading cargo into the interior of said tubes, cargo-handling means for supply cargo to said cargo hold tubes through their wingtip openings, means for tilting said airplane wing spanwise into an attitude inclined downwardly toward said cargo-handling means, said cargo-handling means including a supply tank for liquids having an upper portion at an elevation higher than the higher ends of said cargo hold tubes in said airplane wing, connecting means connecting said supply tank and an end of a cargo hold tube, first valve means between said connecting means and said supply tank, second valve means between said connecting means and a cargo hold tube opening, said two valve means being spaced apart, and drain means for draining that portion of said connecting means between said two valve means.

18. The air-cargo liner defined in claim 17, and means for supplying air under pressure to the interior of a cargo hold tube for expediting removal of cargo from such tube through an outboard end opening thereof.

* * * * *

UNITED STATES PATENT OFFICE
CERTIFICATE OF CORRECTION

Patent No. 4,036,455　　　　　　Dated July 19, 1977

Inventor(s) Philip C. Whitener

It is certified that error appears in the above-identified patent and that said Letters Patent are hereby corrected as shown below:

Title page, [56] References Cited, cancel "Peterson" and insert ..Petersen..; cancel "McLean" and insert ..McLearn..; cancel "Harkamp" and insert ..Hurkamp..;

Column 10, line 34, cancel "sheel" and insert ..shell..;

Column 12, line 10, cancel "said" before corresponding outboard; line 12, cancel "supply" and insert ..supplying..

Signed and Sealed this

Twenty-fifth Day of October 1977

[SEAL]

Attest:

RUTH C. MASON　　　　　　LUTRELLE F. PARKER
Attesting Officer　　　　Acting Commissioner of Patents and Trademarks